United States Patent [19]

Bertino et al.

[11] Patent Number: 5,481,645
[45] Date of Patent: Jan. 2, 1996

[54] PORTABLE COMPUTER WITH VERBAL ANNOTATIONS

[75] Inventors: Gian L. Bertino, Ivrea; Sergio Rainero, Turin, both of Italy

[73] Assignee: Ing. C. Olivetti & C., S.p.A., Turin, Italy

[21] Appl. No.: 60,830

[22] Filed: May 14, 1993

[30] Foreign Application Priority Data

May 14, 1992 [IT] Italy ................................. TO92A0415

[51] Int. Cl.⁶ ..................................................... G10L 9/00
[52] U.S. Cl. ...................... 395/2.79; 395/2.85; 395/2.87; 361/680; 369/25
[58] Field of Search ................................. 395/2.79, 2.81, 395/2.84, 2.85, 2.87, 2.67, 2.76; 381/51; 361/680, 681; 364/708.1, 705.04; 369/24–29, 83; 379/75

[56] References Cited

U.S. PATENT DOCUMENTS

| | | | |
|---|---|---|---|
| 4,309,571 | 1/1981 | Chamberlin | 379/75 |
| 4,398,279 | 8/1983 | Titus, IV et al. | 369/27 |
| 4,458,110 | 7/1984 | Mozer | 395/2.76 |
| 4,462,085 | 7/1984 | Yamamoto et al. | 369/29 |
| 4,571,456 | 2/1986 | Paulsen et al. | 379/96 |
| 4,623,992 | 11/1986 | Kurosaki et al. | 361/680 |
| 4,627,001 | 12/1986 | Stapleford et al. | 395/2.87 |
| 4,686,587 | 8/1987 | Hipp et al. | 369/28 |
| 4,764,965 | 8/1988 | Yoshimura et al. | 395/2.87 |
| 4,772,873 | 9/1988 | Duncan | 395/2.67 |
| 4,779,209 | 10/1988 | Stapleford et al. | 395/2.87 |
| 4,931,950 | 6/1990 | Isle et al. | 395/11 |
| 5,175,672 | 12/1992 | Conner et al. | 361/680 |
| 5,202,817 | 4/1993 | Koenck et al. | 361/680 |
| 5,289,394 | 2/1994 | Lapeyre | 364/709.12 |

OTHER PUBLICATIONS

"Screen Format for a Basic Audio Editor", IBM Technical Disclosure Bulletin, 31(9):46–51, Feb. 1989.

*Primary Examiner*—Allen R. MacDonald
*Assistant Examiner*—Michael Sartori
*Attorney, Agent, or Firm*—Banner & Allegretti, Ltd.

[57] ABSTRACT

A portable computer has a voice section and is capable of processing texts and verbal inserts originating from the voice section. The computer comprises a voice conversion unit, a hard disc unit for the storage in memory or the reproduction of texts and of verbal inserts and function keys (FN F9) to command the access to a voice management program (VOICE). An annotation command (ANNOTATE) permits the visual display on a screen and the leaving in the text of a linkage track for a verbal insert datum. The computer comprises a cover, which carries preset keys which are accessible from the outside for the handling of verbal inserts as in a cassette recorder. The computer links the inserts both in a commercial WP program texts and in texts of a resident program NOTE which is specialized for texts with call-ups for the inserts. It further provides a plurality of compression/decompression programs for compressing and decompressing the voice signals in accordance with differing quality/occupancy ratios of the memory.

9 Claims, 10 Drawing Sheets

PORTABLE COMPUTER WITH VERBAL ANNOTATIONS

FIELD OF THE INVENTION

The present invention relates to a portable computer comprising an electronic unit, an input unit for the control of the electronic unit, a memory, a visual display screen controlled by the electronic unit for the visual display of texts and a voice section, and in which the electronic unit may be placed in a text processing condition in which it can process texts, or in a voice management condition in which it can store in the memory, as verbal inserts, voice signals originating from the voice section.

BACKGROUND OF THE INVENTION

European Patent Application No. EP-A-0,419,177 discloses a computer of the above-defined type, in which the electronic unit controls the recording or the reproduction of voice data in a random access memory. These functions are activated by actuating appropriate buttons, in a similar way to the procedure used for recording and reproduction on a magnetic tape recorder/player. In the recording condition, the audio signals originating from a microphone of the voice section are recorded in the memory, after analog/digital conversion.

Conversely, in the reproduction condition, the signals recorded in the memory are reproduced by a speaker in the voice section, after digital/analog conversion. In this computer, texts and verbal inserts are entirely unlinked.

Furthermore, the U.S. Pat. No. 4,430,726 discloses a centralized system for the dictation and transcription of texts, comprising a series of dictation terminals equipped with a microphone, and a management unit which controls the dictation and transcription terminals. In each dictation terminal, a dictator inputs verbal inserts which, after analog/digital conversion, are stored in the memory of the management unit. Typists, at a series of transcription terminals, receive the verbal inserts from the memory, after digital/analog conversion. In turn, each dictator receives the various messages previously dictated as alphanumeric text portions and is able to process them by means of a program for handling the texts of the system. Moreover, the dictator is able to identify a point of the text and to input to the management unit supplementary inserts which are appropriately handled and provided with markers. The management unit then inputs the verbal inserts transcribed by the typists at the terminal of origin, inserting them at that point of the text which is specified by the dictator. This system, which is very complex, does not permit a combined handling of alphanumeric texts and of verbal inserts.

SUMMARY OF THE INVENTION

Preferred embodiment of the present invention provide a computer of the portable type with a voice management unit, in which it is possible to perform a combined handling and management of texts and of verbal inserts.

One computer embodying the invention, comprises voice management access command means and annotation means. The access command means can be activated to place the electronic unit in the voice management condition during processing of a text, and the annotation means visually display on the screen, and leave in the text being processed, a linkage track for a group of stored voice signals constituting a verbal insert.

Another feature in an embodiment of the invention comprises conversion means for converting signals from the voice section into digital voice signals to be stored in the memory and for converting digital voice signals from the memory into signals for the voice section. Identification means are provided for storing groups of the voice signals in locations of the memory as individually identifiable verbal inserts and for associating with each insert a pertinent identification code and means for visually displaying on the screen data associated with the identification codes of the verbal inserts.

A computer embodying the invention is able to handle texts comprising linkage tracks for verbal inserts, in which said inserts are defined by groups of voice signals stored in the memory and in which the linkage tracks can be visually displayed on the screen. The computer may comprise preselection means for identifying the address of an insert associated with one of the linkage tracks, in response to the positioning of a cursor on a linkage track and insert call-up means which can be actuated to call up selectively a preselected insert and to handle it for reproduction or processing, in accordance with a voice management program.

According to a further feature, the computer may comprise conversion means for converting signals originating from a microphone of the voice section into digital voice signals to be stored in the main memory and for converting digital voice signals from the memory and for converting digital voice signals from the memory into signals for a speaker in the voice section. The computer may comprise a program memory capable of storing a plurality of compression and decompression programs, which can be called up selectively and have differing degrees of compression and selection means for calling up one of the conversion programs to compress and respectively decompress the voice signals in accordance with differing quality/occupancy ratios of the main memory.

The invention is defined in its various aspects in the appended claims to which reference should now be made.

BRIEF DESCRIPTION OF THE DRAWINGS

Preferred embodiments of the invention will now be described by way of example, with reference to the accompanying drawings, in which.

GENERAL DESCRIPTION

Figure 1:
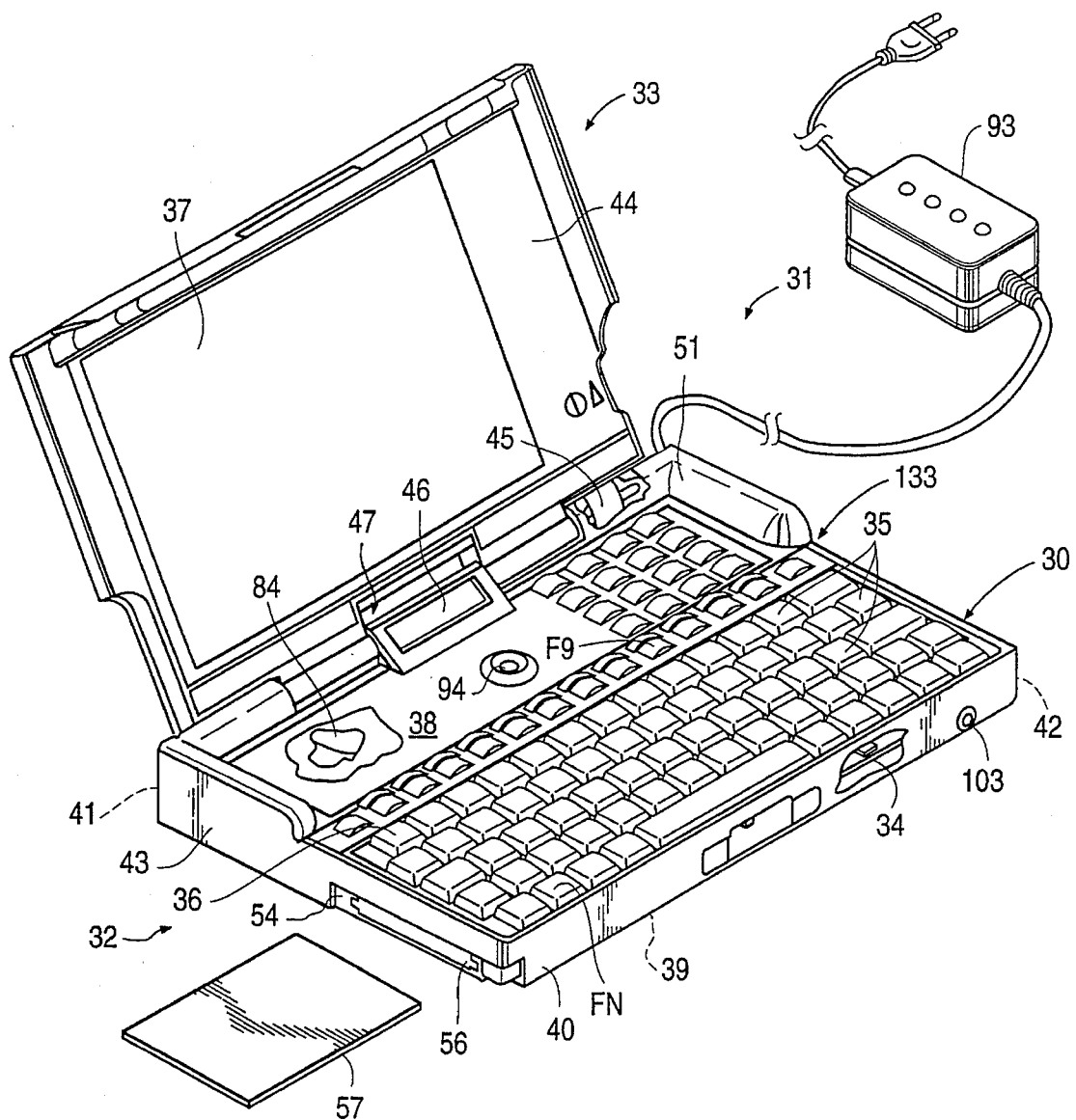
FIG. 1 shows a perspective view of a computer embodying to the invention, in one of its working configurations.

With reference to FIGS. 1–4A, the portable computer has been indicated by 31 and comprises a base body 32, a cover 33 rotatably mounted on the base body 32, an electronic unit 34 and a voice section 30 housed in the base body 32, an input unit comprising keys 35 of a keyboard 36 for the control of the electronic unit 34, and a visual display screen 37 supported by the cover 33 and controlled by the unit 34.

The base body 32 has the shape of a somewhat squashed parallelepiped, and has an upper surface 38 for supporting the keyboard 36, a bottom 39, a front part 40, a rear part 41, a right side 42 and a left side 43. The cover 33 has a front surface 44 and the screen 37 occupies the greater part of the surface 44. The cover 33, in its closed configuration, superposes the surface 44 on the upper surface 38 of the base body 32, protecting the keyboard 36 and the screen 37. In its open configuration, the cover allows access to the keyboard 36 and makes it possible to observe the visual display screen 37.

Figure 2:
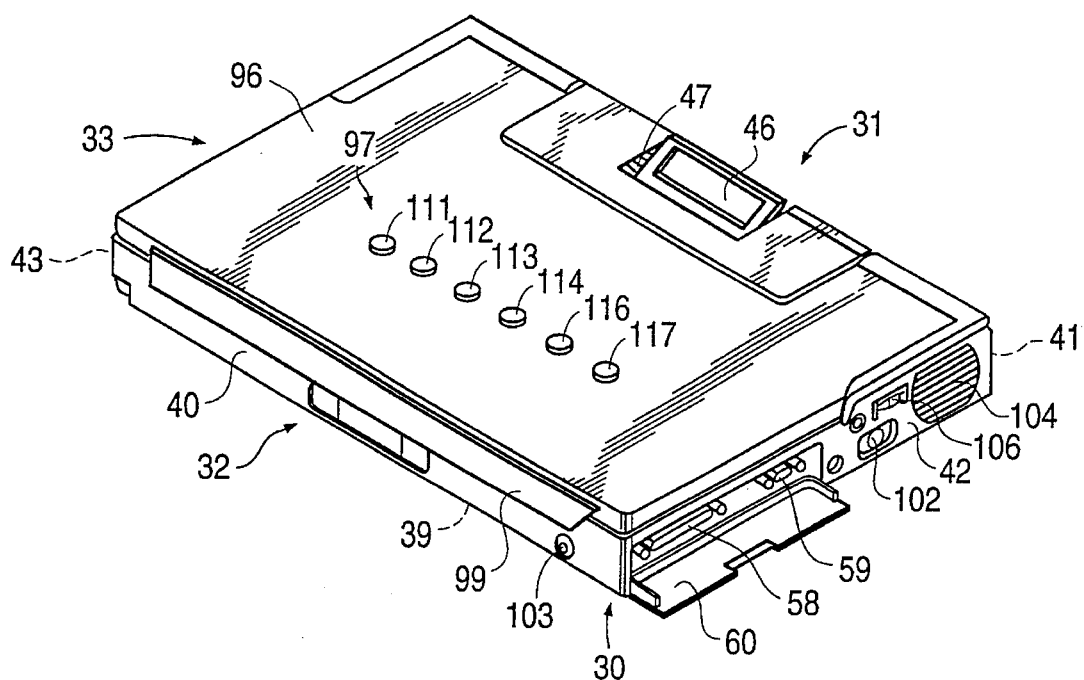
FIG. 2 shows a perspective view of the computer of FIG. 1, in another working configuration.
Figure 3:
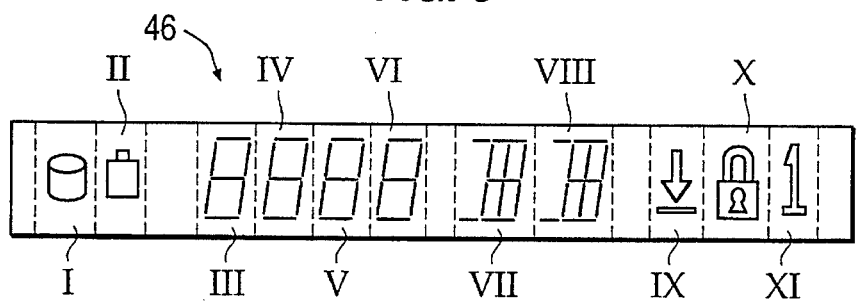
FIG. 3 shows a detail of the computer of FIG. 1.

The computer 31 comprises a mode indicator 46, which has limited dimensions as compared with those of the screen 37 and is supported by the base body 32 to provide a visual display of characters and symbols which are representative of different operational conditions of the computer. The cover 33 has, in a lower part thereof, external to the screen 37, a compartment 47 which enables the mode indicator 46 to be seen, even in its closed configuration (FIG. 2). Flat and flexible cables 45 link the screen 37 with the electronic unit 34 within the body 32, through the rotatable mounting zone between the body 32 and the cover 33.

The computer 31 has very restricted dimensions, is ultraportable, of the palm-held type, and has a basic space requirement corresponding to that of an exercise book of UNI A5 format, of approximately 210×148 mm, and a thickness of approximately 32 mm, in the closed configuration. The cover 33 also has A5 dimensions. The visual display screen 37 is of the liquid crystal type, of 7" reflective type, corresponding to an active surface of approximately 141×106 mm with rectangular dots of 0.24×0.20 mm, for the representation of figures with a graphical resolution of 640×400 dots, and the representation of 25 lines of alphanumeric characters, over 80 columns. The panel of the mode indicator 46 has an active surface of approximately 40×8.5 mm, and has eleven positions I–XI, such as to permit the representation of five graphic symbols and of six alphanumeric characters.

The computer 31 has on the side 43 a slit 54 provided with a connector 56 for the exchange of data and programs with an (IC) microprocessor card or card component 57, for example of the JEIDA, PCMCIA type. On the side 42, the computer 31 further comprises a parallel connector 58 and a serial connector 59 (type RS-232) for the exchange of data, by means of cables, with external peripherals such as modems, visual display units, printers and external mass memories. The connectors 58 and 59 can be covered by a small cover 60.

Figure 4A:
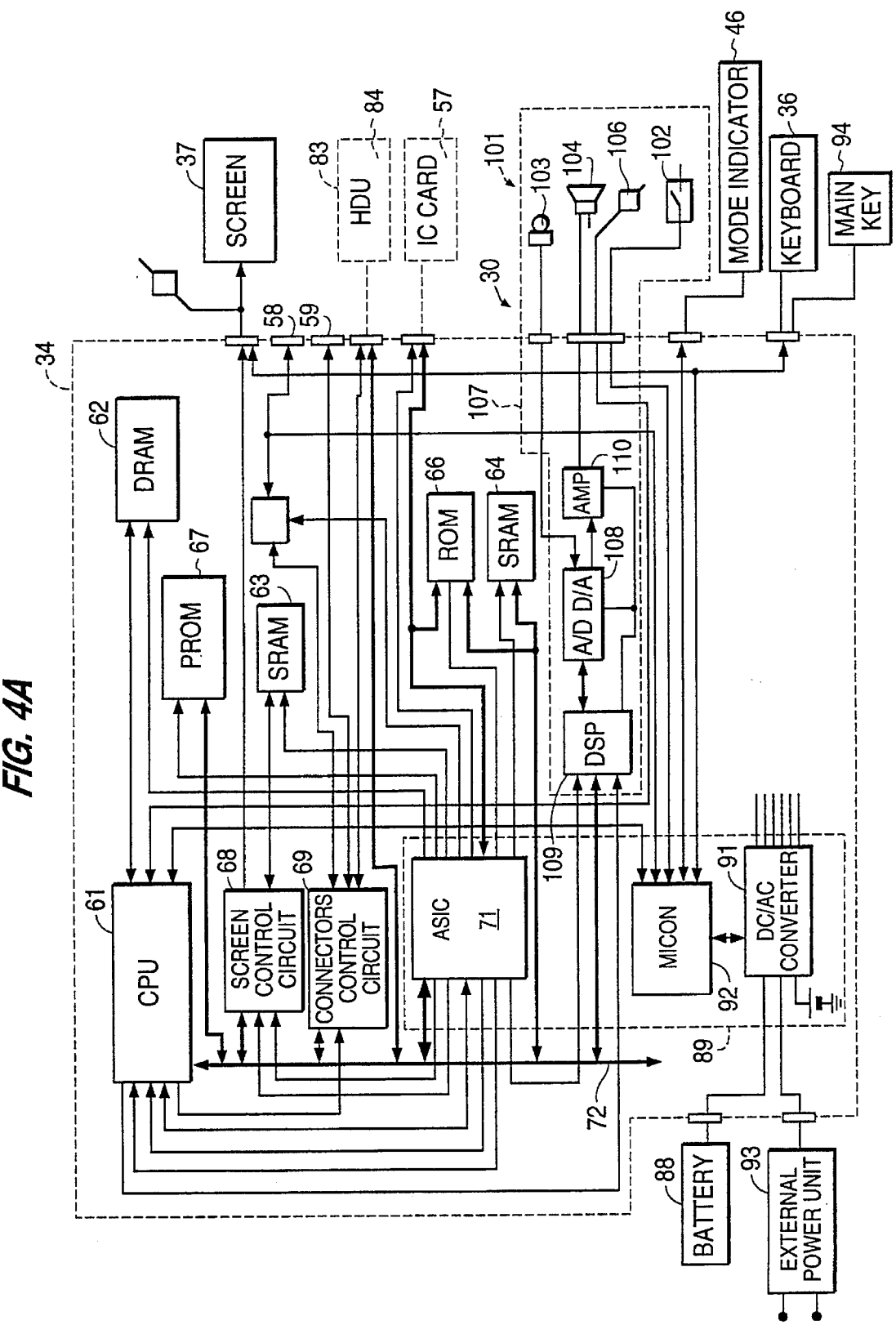
FIGS. 4A, 4B, and 4C show respectively in compact form and in expanded form, a block circuit diagram of the computer of the invention.
Figure 4B:
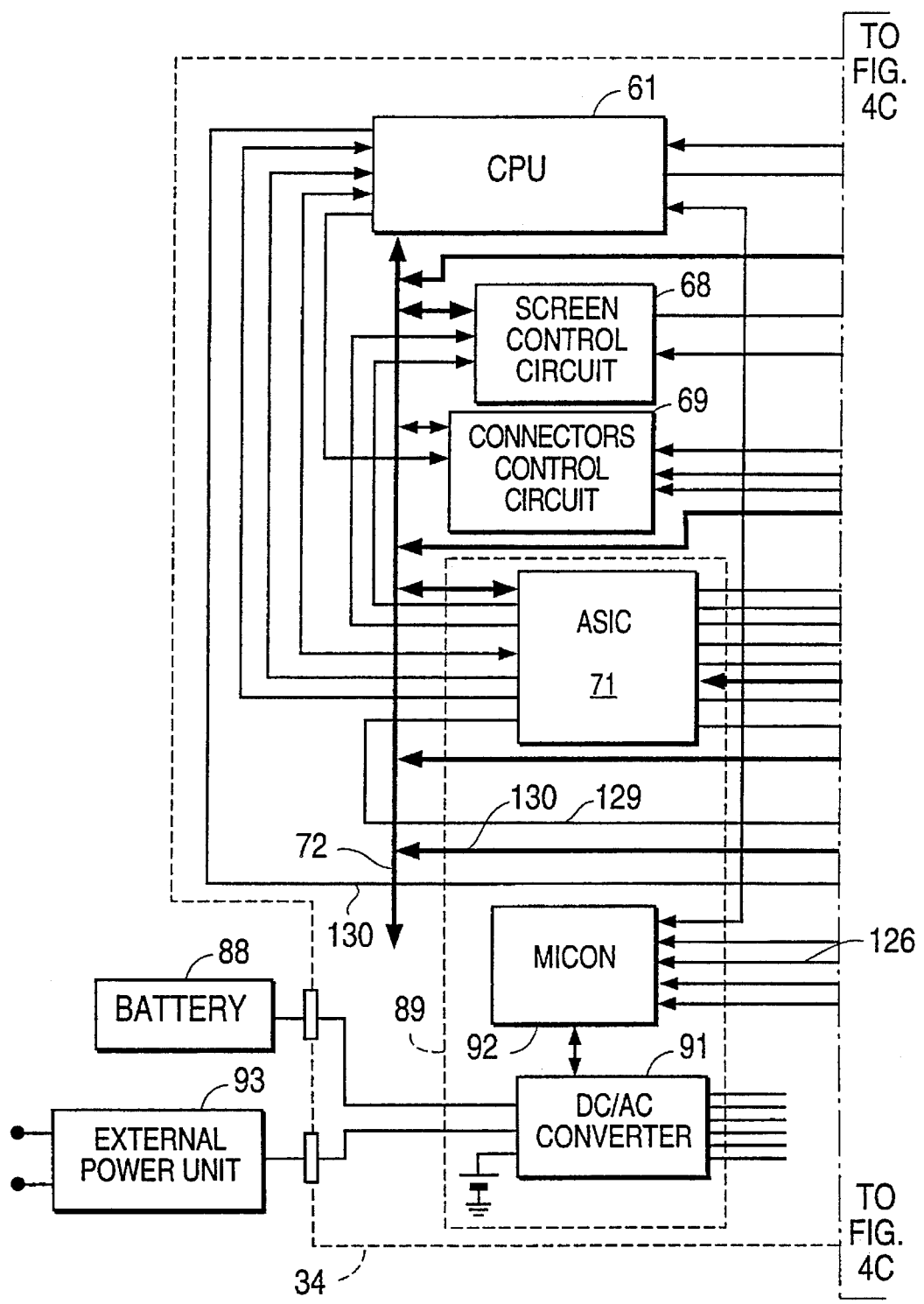
Figure 4C:
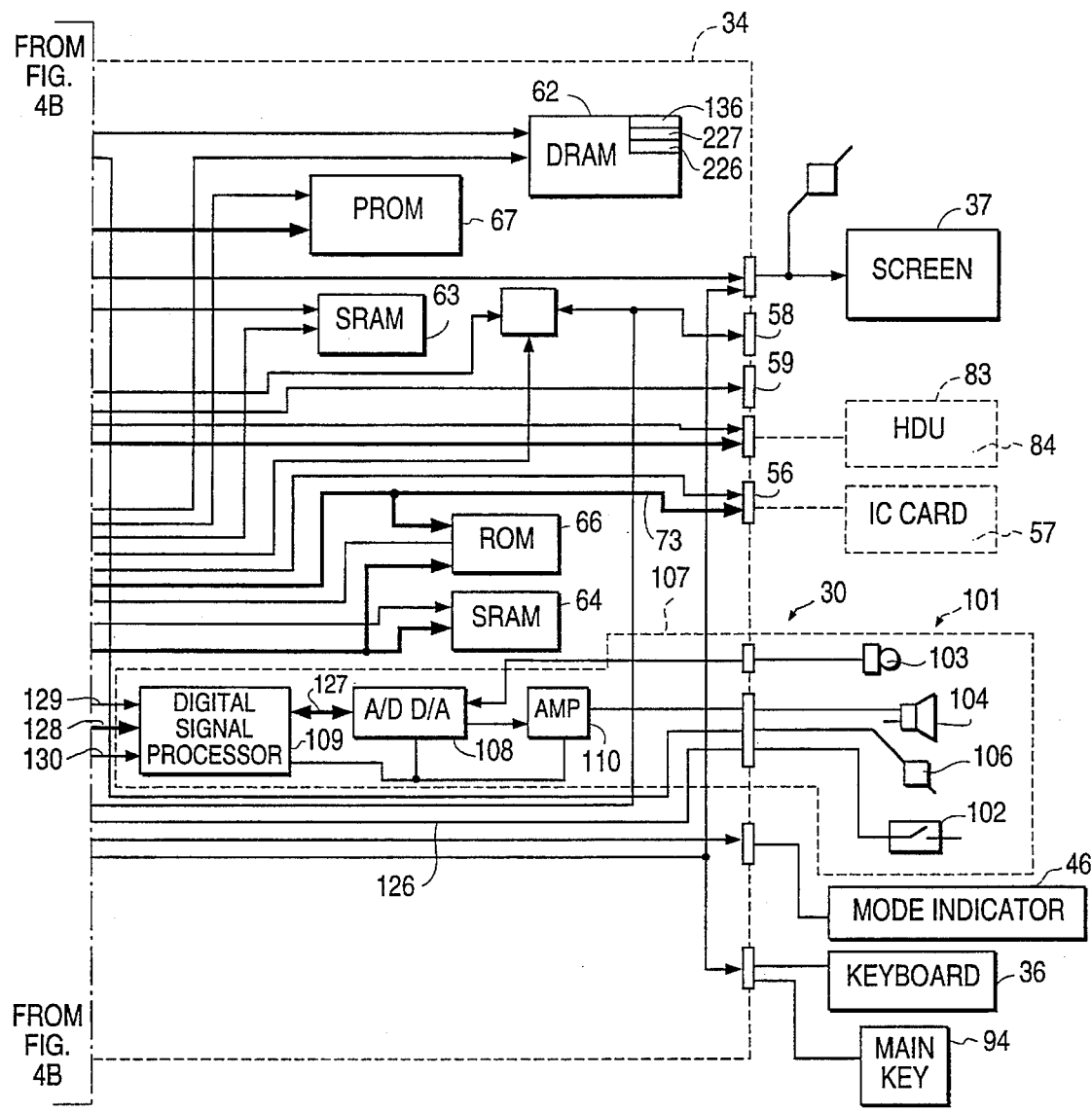

With reference to FIG. 4A, the electronic unit 34 comprises a central processing unit (CPU) 61, a main memory (DRAM) 62 of the dynamic type, memories (SRAM) 63 and 64 of the static type, a read-only memory (ROM) 66 and a programmable read-only memory (PROM) 67. The unit 34 further comprises control circuits 68 and 69, respectively for the screen 37 and for the connectors 58 and 59, and a control and timing unit composed of an application-specific integrated circuit (ASIC) 71 for the memories 62, 63, 64, 66 and 67, for the control circuits 68 and 69 and for the CPU 61. The architecture of the machine is of the XT/AT compatible type, in which the CPU 61, the control circuits 68 and 69, the ASIC 71 and the SRAM 64 are linked together by means of an XT bus 72.

The CPU 61 is composed, by way of example, of an NEC V30HL microprocessor, operating at 16 MHz. The DRAM 62 has a 1 MByte memory, and the SRAMs 63 and 64 are dedicated to the screen 37 and to external lines and have a capacity of 32 KByte and of 128 KByte respectively. The control circuit 68 is, for example, of the type 82C426, while the control circuit 69 is of the type PC87310. The operating system is of the Microsoft MS-DOS type, recorded in the ROM 66, while the PROM 67 permanently records the programs of the base input/output operating system (BIOS).

The computer 31 further comprises a non-volatile mass memory 83, to exchange data with the electronic unit 34 via the XT bus 72. The memory 83 may preferably comprise a hard disc unit (HDU) 84, fixedly mounted within the base body 32. Some of the keys 35 of the keyboard 36 are preset to provide access to the mass memory 83 and the mode indicator 46 provides a mass memory symbol, in position I (FIG. 3), which can be visually displayed to indicate activation of the mass memory by the unit 34.

The electronic unit 34 also has a control circuit 89 comprising a DC/DC voltage converter 91 to provide the supply current to the various components of the unit 34 and a microprocessor (MICON) 92 having functions to control and manage the converter 91, scanning and drive functions for the keyboard 36, the screen 37 and the mode indicator 46 and other functions, including the clock function.

A battery set 88 (FIG. 4A) can be housed in the body 32 and is capable of powering the electronic unit 34 via the control circuit 89 to power the various functions of the computer 31. The DC/DC converter 91, under the control of the MICON 92, defines a condition of activity (RUN) in which it is possible selectively to activate the various components of the unit 34, the keyboard 36 and the screen 37. The converter 91 also defines restricted and reduced-power operational conditions of the computer 31 in which the absorption of energy from the batteries 88 is restricted in all cases in which certain capabilities of the computer are not being utilized. The batteries 88 are of rechargeable type. The computer 31 can moreover be linked to an external power supply device 93 to operate on an external power supply and to recharge said batteries 88.

The MICON 92, for example of the type M37410M4, is linked to a main key 94 on the surface 38. Pressing the key 94 activates the MICON 92 to preset the electronic unit 34 in a suspension condition (SUSPEND) in which the said MICON 92 is only operative for the clock function and in which the absorption of energy from the batteries 88 is negligible. The MICON 92 is also able to place the electronic unit in the suspension condition when, for a certain limiting time period, (for example 2'), the keys of the keyboard 36 are not actuated. From the suspension condition, it is then possible to return to the active condition by pressing the key 94 once again.

The MICON 92 also sends signals to the indicator 46 to provide a visual display of certain alphanumeric characters in the positions VII and VIII, such as to represent the restricted operational conditions preset by said circuit 92. A graphic symbol of a battery, in the position II of the indicator 46, is also generated by the circuit 92 to provide a visual display of a condition of charge insufficiency in the batteries 88. In the suspension condition, the MICON 92 shows the time in the positions III–VI of the mode indicator 46.

The cover 33 (FIGS. 1 and 2) has a surface 96, on the opposite side to the surface 44, which is accessible from the outside when the cover is in its closed configuration. The surface 96 carries six preset keys 97, which are linked with the electronic unit 34 via the cables 45. As will be described in detail, the keys 97 are provided to preset some of the operational conditions of the computer 31, which relate in particular to the voice management. The keys 97 allow the computer 31 to be used as an external recorder, just as the keys of the keyboard 36 enable it to be used as a computer. The MICON 92 also prevents the keys 97 from being enabled when the electronic unit 34 is in its computer activity condition (RUN).

The voice section 30 according to the invention comprises a voice input-output unit 101 for the input and output of sounds, a voice conversion unit 107 of the electronic unit 34 and preset means, comprising the preset keys 97 for presetting various operational conditions of the computer in the voice management condition. The unit 101 comprises, in particular, a microphone 103 disposed on the front part 40 of the base body 32, a speaker 104 and a volume regulator 106 which are disposed on the right side 42. A switch 102 is also provided, this also being disposed on the side 42, to enable the keys 97.

The voice conversion unit 107 converts the analog signals originating from the microphone 103 into digital signals which can be processed by other circuits of the unit 34 and, conversely, converts digital signals originating from circuits of the unit 34 into analog signals to be reproduced as sounds by the speaker 104. To this end, the unit 107 comprises an AD/DA circuit 108 linked to the microphone 103, a digital signal processor (DSP) 109 linked between the circuit 108 and the XT bus 72 and an amplifier 110 for the speaker 103 linked to the AD/DA circuit 108.

With regard to the sounds at the input, the AD/DA circuit 108 samples the signals originating from the microphone 103 and converts them into voice bit strings. The processor DSP 109 processes the voice bit strings received from the circuit 108 and sends them as encoded voice bits to the CPU 61. For the sounds at the output, the processor DSP 109 processes the encoded voice bits received from the CPU, decodes them and sends them as voice bits to the AD/DA circuit 108. The latter converts the voice bits into analog signals which, via the amplifier 110, are reproduced by the speaker 104.

The encoded voice bits are storable in the mass memory 83 composed of the HDU 84 or of the IC card 57. In particular, the memory 83 is subdivided into partitions, having a plurality of locations which are capable of storing, as an individual message, a series of encoded voice bits. The electronic unit 34 controls, in a suitable manner, a marker to provide access to each partition of the memory and in sequential locations of the partition selected to provide access to the various parts of the message.

The preset keys 97, in the external recorder operational condition of the computer 31, have functions similar to those of the recording and reproduction keys of a conventional magnetic cassette recorder of the portable type. To this end, the keys 97 comprise an RW key 111 for a fast displacement of the marker from a current location of the memory 83 to previous locations, a PAUSE key 112 for stopping the recording or the reproduction of the verbal inserts, a STOP key 113 to place the computer in a neutral condition stopping the recording or the reproduction of a verbal insert, a REC key 114 for the recording of a verbal insert as from the current location of the memory 83, a PLAY key 116 for the reproduction of the verbal inserts as from the current location and an FF key 117 for a fast displacement of the marker to successive locations in the memory.

The keys 111, 112, 113, 114, 116 and 117 are substantially aligned with one another, parallel to a plane of symmetry of the surface 96 of the cover 33. The position of these keys is at approximately 45 mm from the front edge of the cover 33, and such as to permit the operator to be able to operate these with the fingers of the hand holding the computer 31.

Figure 6:
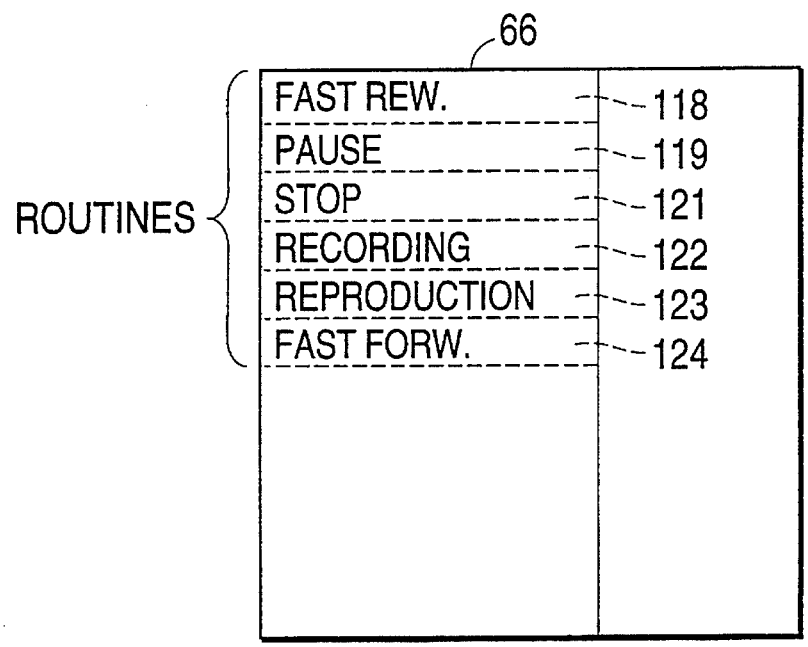
FIG. 6 is a detail of the circuit diagram of FIG. 4.

In the ROM 66 of the electronic unit 34 there are provided routines 118, 119, 121, 122, 123 and 124 (FIG. 6) which respond to the pressing of the six keys 97 to activate respective functions of fast rewind, pause, stop, recording with insertion, reproduction and fast forward, which are preset by actuating the RW, PAUSE, STOP, REC, PLAY and FF keys respectively. The indicator 46 will correspondingly visually display in the positions VII and VIII the symbols RW, PA, ST, IN, PL and FF, after appropriate transfers to the DRAM 62. Furthermore, the routine 124 responds to a repeated pressing of the FF key 117 to move the marker quickly on to the last location of the selected partition and the routine 118 responds to a repeated pressing of the RW key 111 to move the marker quickly back to the first location of the memory partition.

The routine 116 responds to a simultaneous pressing of the PLAY key 116 and of the FF key 117 to advance (with scanning) the marker at a slightly greater speed than that of reproduction and provides a visual display of this condition using the symbols FS in the positions VII and VIII of the indicator 46. The routine 122 in turn responds to a simultaneous pressing of the PLAY key 116 and of the RW key 111 to rewind (with scanning) the marker at a slightly greater speed than that of reproduction and provides a visual display of this condition using the symbols RS in the indicator 46. Finally, the routine 122 responds to a simultaneous pressing of the PLAY key 116 and of the REC key 114 to overwrite verbal inserts onto the pre-existing recordings, as from the current location, and indicates such a condition using the symbols OW.

VOICE SECTION

The voice input-output unit 101 of the voice section 30 constitutes the user/system interface for all the functions of recording and reproduction of the voice. The microphone 103 is the means of conversion of the sound waves into an analog signal congruent with the subsequent analog/digital conversion stage composed of the A/D and D/A circuit 108. The speaker 104 is the means of conversion of the analog signal emitted by the amplifier 110 into sound waves which can be heard by the user.

The switch 102 has two positions ON-OFF, respectively for enablement and disablement of the preset keys 97. In the suspension condition of the electronic unit 34, the switch 102 operates as a safety device preventing, in its disablement position, unintentional activation of the functions relating to the preset keys 97, for example when the cover 33 is closed. In the enablement position ON, the switch 102 generates a voice selection signal DEC-SW on a line 126 (see FIGS. 4B, 4C) which is interpreted by the MICON 92 as an enablement signal for the keys 97. Even if the switch 102 is in the ON position, the MICON 92 places the electronic unit 34 in the suspension condition when the keys 97 are not actuated within a limited time period.

Figure 7:
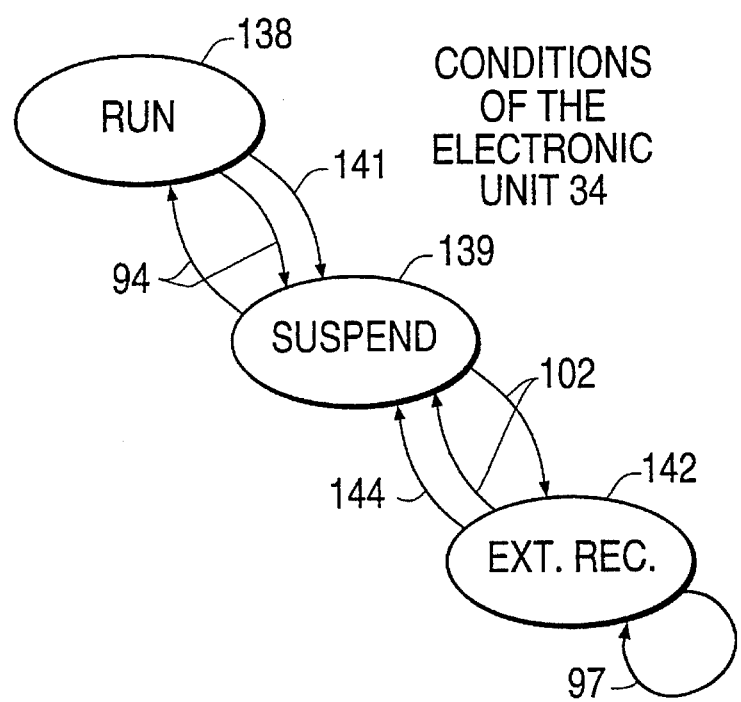
FIG. 7 is a block diagram of modes of operation of the computer of FIG. 1.

The diagram of FIG. 7 shows in diagrammatic form the various conditions of the unit 34 and the possible changes of condition which are permitted by the MICON 92. In the active condition (RUN), indicated by 138, the MICON 92 presets the computer operational condition in which the keyboard 36 is enabled, while the keys 97 are disabled. From the RUN condition, the MICON allows access to the suspension condition (SUSPEND), indicated by 139, by pressing the main key 94 or, via a route 141, if the keys of the keyboard 36 have not been actuated within the time limit. From the SUSPEND condition and when the switch 102 is at ON, the MICON allows access to the external recorder operational condition (EXT REC), indicated by 142, in which the keys 97 are enabled, while the keyboard 36 is disabled.

Pressing the keys 97, after the execution of the pertinent functions, causes a return to the REC EXT condition 142. The MICON 92 allows access from the condition 142 to the SUSPEND condition 139, either in response to the positioning of the switch 102 in the OFF position or, via a route 144, if the keys 97 have not been actuated within the time limit. Finally, access from the condition 139 to the RUN condition 138 is allowed by actuating the main key 94.

The volume regulator 106 comprises a small wheel disposed on the right side 42 of the computer 31, which small wheel can be actuated directly by the user and acts on a potentiometer which is in turn linked to the input of the amplifier 110. The regulator 106 permits a linear regulation of the sound volume from a minimum, with the potentiometer at the start of its travel and consequently with no emission of sound, to a maximum, with the potentiometer at the end of its travel and maximum power of the signal at the output of the amplifier 110. The volume may also be regulated by an automatic control device, to a value which is predetermined in a program-selectable manner.

The A/D and D/A circuit 108, for example of the CODEC type identified by the reference AD 28MSP02 of the Analog Device, performs the function of A/D conversion by sampling at a frequency of 8 KHz the analog signal originating from the microphone 103 and generating digital samples encoded on 16 bits (words). These words, temporarily stored in internal registers of the CODEC, are then sent to the DSP 109 via a serial line 127 for subsequent handling. In a similar way, the D/A conversion consists in converting, at a frequency of 8 KHz, the samples on 16 bits, originating from the DSP 109, via the serial line 127, into an analog signal which is subsequently amplified by the amplifier 110. In a known manner, the frequency of 8 KHz permits the reproduction of signals in the telephone band of 4 KHz.

The amplifier 110 has a fixed gain equal to 2 (two) and amplifies the signal originating from the circuit 108 which has already been varied in intensity by the potentiometer of the volume regulator 106.

The Digital Signal Processor DSP 109, for example of the Analog Devices type 126 identified by the reference AD SP 2111, as is known, comprises a CPU whose functions are optimized for the handling of digital signals and which has an internal architecture with an arithmetic unit (ALU) which is suitably powerful. The DSP 109 further comprises a service memory composed of a static RAM into which the operational program is unloaded, two serial ports which are supplemented by buffers for the reception and the transmission of data and an interface for linking with the XT BUS 72. The DSP 109 is managed by the CPU central unit 61 as an intelligent peripheral which can be specialized in real time in the function to be reproduced and possesses the dual function of compression and decompression of the voice signal originating from the circuit 108.

The voice compression consists in executing, in accordance with suitable algorithms, a series of arithmetic and logic operations on the samples of the digitalized voice signal in such a manner that the information contained in the 16 bit words of the circuit 108 is condensed into characters of shorter length which are fed into the XT BUS 72. Voice decompression consists in the opposite process. By means of a decompression algorithm, which is complementary to the compression algorithm, the characters containing the compressed voice information which are extracted from the XT BUS 72 are transformed into 16 bit words which are congruent with the D/A part of the circuit 108.

The voice compression and decompression algorithms are implemented in a series of programs contained in the ROM 66. In the stage of recording a verbal insert, the program relating to a specific request by the user is automatically extracted from the ROM 66, loaded into the internal RAM of the processor DSP 109 and activated. During the reproduction stage, the operative program of the CPU 61 extracts the identification parameters of the message to be reproduced from the memory and, consistently with said parameters, extracts the selected decompression program from the ROM 66 and sends it to the DSP 109. This mechanism managed by the CPU 61 is repeated each time an operative condition of the processor DSP 109 changes.

In the computer 31 according to the invention, three different levels of compression and decompression are possible. The first level, which is very low, and conventionally defined as zero (N), utilizes a PCM logarithmic algorithm, which is known per se and which generates an 8-bit code for each sample of the digitalized voice signal. To the first level of compression there corresponds, after decompression, a high quality of the sound emitted, such as to reproduce fairly faithfully even musical passages. On the other hand, the memory occupancy per unit of recording time is high.

The second level, which is low (L), utilizes an ADPCM algorithm, which is known per se and which generates a 4-bit code for each sample of the digitalized voice signal. To this level of compression there corresponds a medium quality of the sound emitted, with good recognizability of the voice. This gives a medium memory occupancy per unit of time.

The third level, which is high (H), corresponds to the GSM algorithm, which is also known and which generates a 1.5 bit code for each sample of the digitalized signal. To the third level of compression there corresponds a poor quality of the sound emitted, but this quality is sufficient for the recognition of the recorded words. Advantageously, however, it gives rise to a low memory occupancy per unit of recording time.

As an alternative to the storage of the compression algorithms stored in the ROM 66, the computer 31 provides algorithms stored in the memory 83 and these can also be called up selectively by program and loaded into the service memory of the DSP 109.

The processor DSP 109 is linked to the electronic unit 34 via a set of lines from which of particular note are a BUS 128, a CS line 129 and a DSPCLK line 130. The BUS 128 is in turn linked to the XT BUS 72 of the computer 31 in such a manner as to link the DSP 109 to the other components of the electronic unit 34, including the CPU central unit 61 and the ROM memory 66.

The CS line 129 has the function of enabling the DSP 109. In its active condition, it enables the DSP 109 to dialogue in input and output with the electronic unit 34. The DSPCLK line 130 is the line through which the DSP 109 receives the clock pulses.

KEYBOARD

Figure 5:
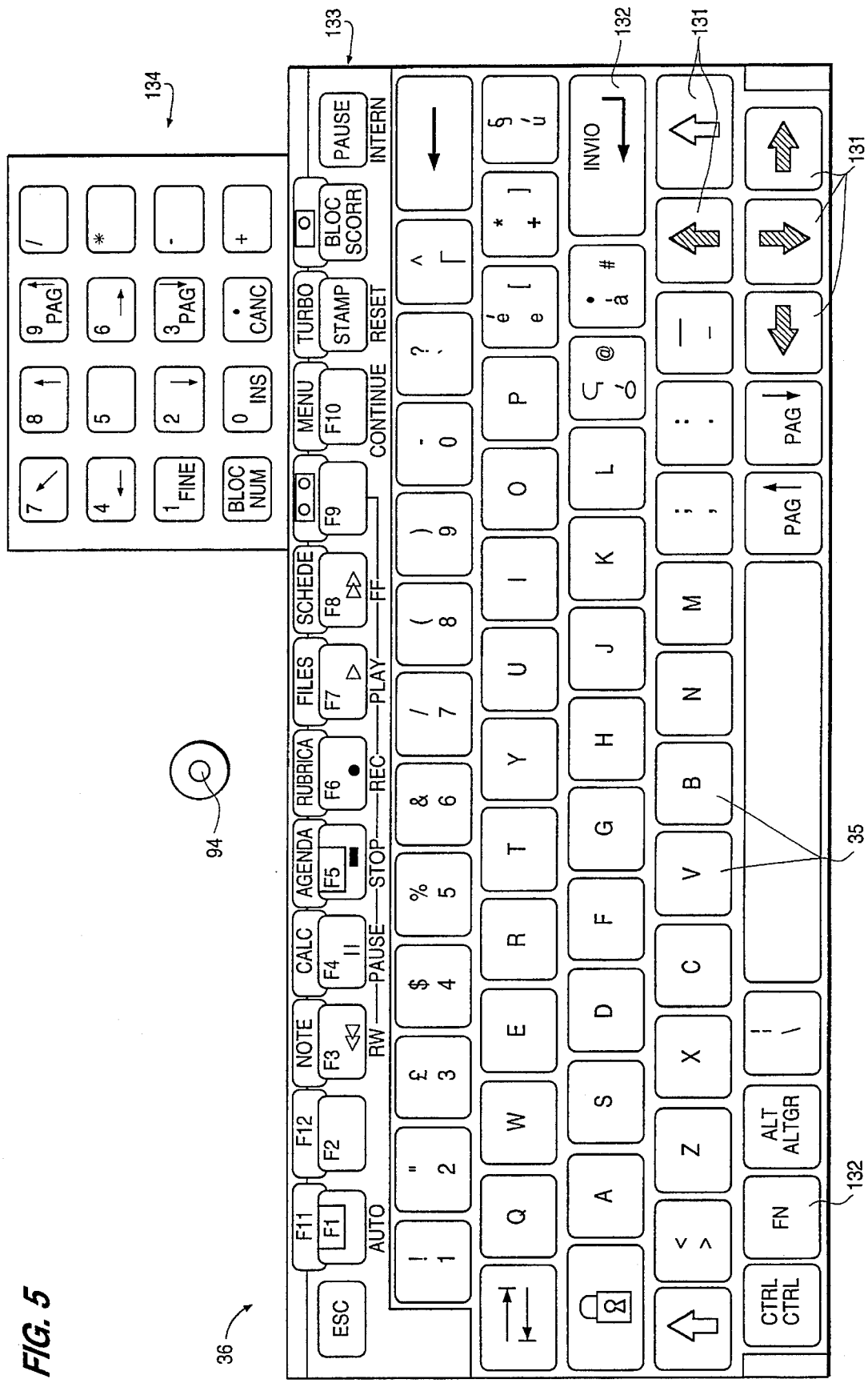
FIG. 5 shows a view of a detail of the computer of FIG. 1.

The keyboard 36 (FIG. 5) is similar to that of a standard personal computer (PC) with 102 keys (which is not shown in the drawings) and, when it is enabled, it can directly call up the greater part of the functions which can be directly called up by the keyboard of a standard PC. In particular, the keyboard 36 has sixty-four alphanumeric character and control keys comprising an ENTER key, control keys CTRL and ALT, five cursor keys 131 to move the cursor and a key for multifunctions and for new functions FN 132.

The keyboard 36 also comprises a row of fourteen function keys 133 including an ESC key, ten function keys F1–F10 and three keys for Print, Scroll lock and Pause, which are identifiable in the corresponding function keys of a standard PC. Finally, there is provided a number keyboard 134 with sixteen number and supplementary service keys, which is similar to the number keyboard of a standard PC and comprising the usual number lock key. The presets of the functions activated by the Scroll lock, Caps lock and Num lock keys are respectively visually displayed in the positions IX–XI of the mode indicator 46.

In the computer operation condition, ninety-seven functions of a standard PC keyboard can be directly activated by the keyboard 36. The only keys which are missing are the keys which, in a standard PC, correspond to the function keys F11, F12, ALT right, CTRL right and ENTER. Their functions can nevertheless be activated by pressing the FN key 132, simultaneously with the F1, F2, ALT, CTRL and ENTER keys. These keys will thus activate respectively the functions which in a standard PC are activated by the F11, F12, ALT right, CTRL right keys and the ENTER key of the number keyboard.

In a similar way to standard PCs, the signals of the various keys of the keyboard 36, after encoding, are temporarily stored in a keyboard buffer, from which they are then progressively extracted by the CPU 61, for their processing in accordance with the application program. The DOS programs reserve for the keyboard buffer function a zone 136 of the DRAM 62 for the storage of a series of commands originating from the keyboard 36. The zone 136 starts with the address 40:1E and finishes at the address 40:3C.

PROGRAM MODULES

The computer 31 stores, in the ROM 66 or in the memory 83, a series of personal program modules, for a multifunction mode thereof, as follows:

NOTE: For processing alphanumeric texts with verbal inserts;

CALC: To execute algebraic operations as in a manual computer;

SCHEDULE: To record and review appointments, to plan daily or weekly activities and with a calendar function;

PHONE BOOK: To store lists of names, addresses and telephone numbers and to permit the sending of acoustic or electrical telephone pulses via a modem channel;

FILE MANAGER: For DOS operations on Directory, File, Locate, Info, Format and Quit;

ORGANIZER: To use lists of projects with characteristics of simple databases;

VOICE MANAGER: To activate the voice management condition and the functions provided for the handling of the verbal inserts;

MENU: To preset some personalized items of the computer, relating to characteristics of the screen and of the functions concerning energy saving.

The personal programs NOTE, SCHEDULE, PHONE BOOK, ORGANIZER and VOICE MANAGER permit the operator to create and to store specific DOS files. The files created with these programs will have automatic extensions, respectively: ":NTE" for the NOTE program; ".SCH" for the SCHEDULE program; ".PHN" for the PHONE BOOK program; ".ORG" for the ORGANIZER program; and ":VOI" for the voice manager program.

The program modules are presented as Menu lines on the screen 37 and the operator, after activation of the computer, is able to select the desired program, for example by moving a cursor key 131 and confirmation thereof, in a manner known per se. These programs can also be called up by pressing the keys with the initials of the individual programs "N"; "C"; "S"; "P"; "F"; "O"; "V"; and "M".

The programs NOTE, CALC, SCHEDULE, PHONE BOOK, FILE MANAGER, ORGANIZER and VOICE MANAGER may be directly called up by pressing one of the keys F3–F9, together with the FN key 132. The F1 key has the function of a HELP key and the key F10 has the function of Menu command. For example, the operator will be able to activate the voice management condition of the VOICE MANAGER program by pressing, together, the FN new functions key 132 and the key F9. The key F9, inter alia, for ease of recognition, shows a symbol for a conventional magnetic tape cassette.

In the VOICE MANAGER program, and in the computer operation condition, in particular with the cover open, the keys F3–F8 repeat the commands of the keys RW, PAUSE, STOP, REC, PLAY and FF of the cover 33, defining the same operational conditions which can be preset by the keys 97, in the EXT REC external recorder operational condition.

TEXT MANAGEMENT

The portable computer 31, in a similar way to standard PCs, is capable of processing alphanumeric texts by means of any commercial WP program for handling alphanumeric texts of commercial type, for example the program OLITEXT of the company Ing. C. Olivetti & C., S.p.A. The WP program may be loaded into the mass memory 83 in any known manner, for example via the serial connector 59. The call-up of the WP text processing program loaded in memory, the specific meaning of the keys of the keyboard 36, the loading of the text and its processing will then follow the specific rules to that program. With regard to the present invention, programs of particular interest are the WP programs of widespread use which handle alphanumeric texts using the DOS standard keyboard buffer of the reserved zone 136 of the DRAM 62.

The program NOTE is a program for handling characters and verbal inserts which permits the writing of files of texts or the taking of simple notes, in a similar way to other known programs for processing texts and the handling of verbal inserts according to the invention, as will be described hereinbelow. The NOTE program module, activated for example by pressing the FN key 132 and the function key F3, provides a visual display on the screen of an image (in video form) 201 (FIG. 8), comprising a command window 202 with a menu of selectable commands, a text window 203 and an auxiliary information window 204.

The window 202 shows inscriptions relating to the commands: SEARCH, CUT & PASTE, ENLARGE, DATE, MEMO, PRINT, FILE, RULER, VOICE, VIEW and QUIT. The commands are individually selectable, for example, by actuation of one of the cursor keys 131, the selected inscription being embolded as compared with the other inscriptions by the program. The command is then executed after actuation of the ENTER key. The text window 203 provides a visual display of the characters and the symbols of the text and the cursor, and has, in the first line, a representation of the current line, with print, margin and tabulation stop positions and the position of the cursor. In turn, the window 204 provides a visual display of indications of selected function keys, or their description, as well as the current date and time.

The commands: Search; Cut & Paste; Enlarge; Print; Ruler; Memo; View; and Quit perform substantially known corresponding functions of: search; movements, deletion and merger of paragraphs; enlargement of characters; printing of the text; definition of a print line; print memo "From: To:"; visual display of the cursor; and exit from the program, and will not therefore be described in detail.

The command Date activates the program NOTE for the inscription and the storage, at a point of the text defined by the cursor, of the current date derived from the MICON 92 and which is visually displayed in the current position of the cursor.

The command File activates the program NOTE for a preselection of the functions of load, save, import and export of text files. These functions are visually displayed in a submenu from which the operator accesses the specific function. After definition of the name of the file, the program will provide for the execution therein of the desired function. In the case of selection of the Save function, the program NOTE will add the DOS extension ".NTE" to the name defined by the operator.

Figure 9:
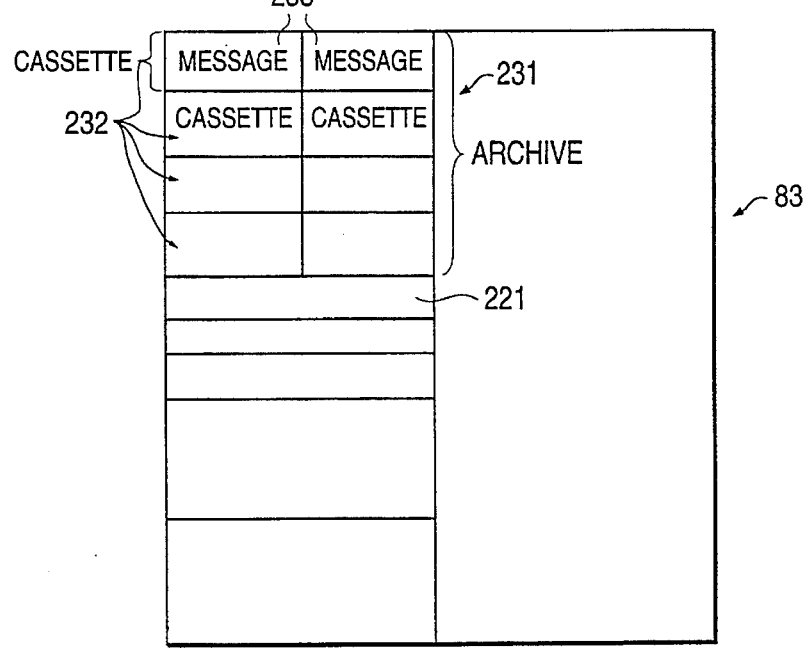
FIG. 9 is another detail of the circuit diagram of FIG. 4.
Figure 14:
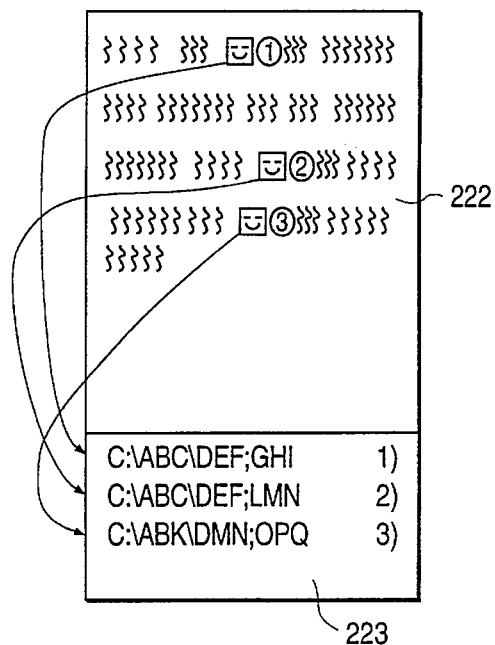
FIG. 14 shows a part of the detail of FIG. 9.

In accordance with the invention, a text file 221 (FIGS. 9 and 14) of the program NOTE comprises in the memory 83 a zone 222 which can be visually displayed and in which the text is stored and a zone 223 which cannot be visually displayed and in which address data are stored for verbal inserts linked with parts of the text of the zone 222. The command Voice, which is activated in the execution of a file of the program NOTE, calls up the program VOICE MANAGER for an internal automatic handling of verbal inserts, as will be described below. This program further stores in a zone 226 of the DRAM 62 the identification data of the file with extension ".NTE" being processed, including the content of the last image and the position of the cursor.

VOICE MANAGEMENT

In accordance with the invention, the VOICE MANAGER program module is stored in the mass memory 83 and permits the management both of verbal inserts in a manner external to the program of origin and of verbal inserts in a manner which is automatic and internal to the program NOTE. In both cases, this program handles and stores groups of digital voice signals relating to a verbal insert in such a manner that these are individually identifiable, it associates with the signals of a given verbal insert an identification code and makes it possible, for such an insert, to provide a visual display of some information of interest to the operator. The sound recordings, in the memory 83 (FIG. 9) are organized in three levels which are hierarchically concatenated: ARCHIVE 231, CASSETTE 232 and MESSAGES 233.

Figure 10:
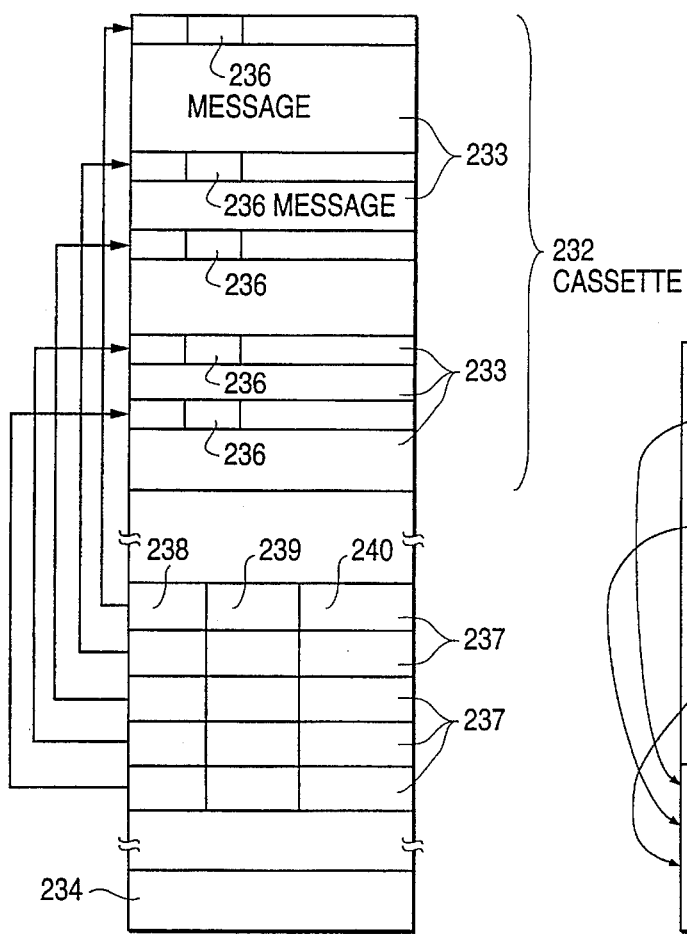
FIG. 10 is another detail of the circuit diagram of FIG. 4.

The archive 231 comprises a set of cassettes 232 having a common denominator and assembled by the operator under one and the same name. The ARCHIVE is thus a set of correlated CASSETTES and is the equivalent of a "DIRECTORY" of a DOS operating system. The cassette 232 (FIG. 10) is a set of MESSAGES 233, constituting voice recordings, assembled under one and the same index, and is representative of a "FILE" of the DOS operating system. With each cassette 232 there is associated a base descriptor 234, containing information which is characteristic of the cassette 232.

The (verbal) MESSAGE 233 is the smallest unit of verbal insert and is composed of a set of digital voice signals which are individually identifiable. It is composed of a succession of characters 236 having the length of one byte (8 bits) containing the digital code of the sound signal recorded by means the voice unit 30. The voice messages 233 are stored in sequence in the mass memory 83 and with each message 233 there is associated a message descriptor 237 containing information which is characteristic of the message 233.

The base descriptor 234 contains a marker for the message descriptors 237 and some information which is specific to the cassette 232. The program VOICE MANAGER provides a default cassette 232 in the name "RECORDER" and the possibility for the operator of creating a plurality of cassettes 232 and possibly of changing the default cassette. All the cassettes 232 have the extension ".VOI" which is specific to the VOICE MANAGER program module.

The descriptor 237 contains message start markers 238 and an identification code 239 comprising reference data generated automatically by the VOICE MANAGER module and optional data which can be imprinted by the operator. Each marker 238 comprises the address of a first character 240 of the message 233. The reference data unambiguously identify the verbal message 233 within the cassette 232. These data comprise an occupancy time indication, for example in seconds, which is representative of the total time occupied in memory by the preceding voice messages and the start date and time of the recording. After each recording, the VOICE MANAGER program stores the code 240 of the first free character and a part of the code 239 comprising the occupancy time indication of the cassette 232.

The optional data comprise, in turn, a series of alphanumeric characters with the name of the verbal message 233 and a possible comment. The length of a message will be derivable as the difference between the value of the occupancy time indication of its code 239 and the value of the time indication of a subsequent message. The VOICE MANAGER program module can be called up by voice management access command means which comprise particular routines.

When the computer is in its external recorder operational condition, the routines relating to the access command are called up only in response to the pressing of the preset keys 97, with the switch 102 in the ON position. The computer 31 will operate as a conventional cassette recorder. The operator will be able to record verbal messages in the manner which has already been indicated, by pressing the REC key 114. The VOICE MANAGER program in recording gains access to the location of the memory 83 defined by the first free character address of the marker 238 and will store the individual messages in the RECORDER default cassette 232 or in the cassette intended for this purpose, as from the free position of the memory 83. The marker 238 will then move following the recording and at the end of the recording, in response to the pressing of the STOP key 113, the VOICE MANAGER program will store the new code 240 for the first free character and the new occupancy time indication of a possible new message.

The operator will be able to activate the other functions of the preset keys 97, in the manner described for gaining access to various parts of the current message and of the other messages of the cassette 232. A double pressing of the PLAY key 116 will be recognized by the routine 123 as a sequential access call-up for all the messages of the cassette. The simultaneous pressing of the PLAY key 116 and the FF key 117 will permit access to be gained, in forward jumps, from one message to the next, giving a sound indication at each jump. Similarly, the simultaneous pressing of the PLAY key 116 and the RW key 118 permits access to be gained, in backward jumps, from one message to the preceding one, giving a sound indication at each jump.

Figure 8:
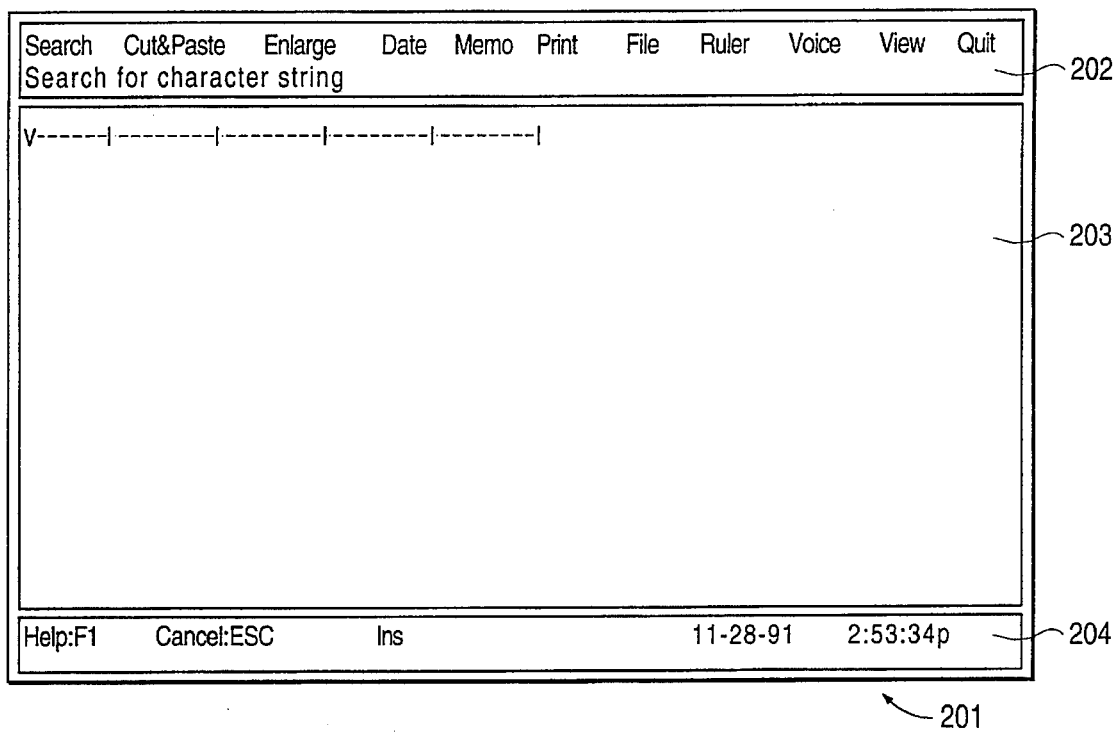
FIG. 8 is a view of a detail of the computer of FIG. 1, in a given operational condition.

When the computer 31 is in its computer operational condition, the routines relating to the voice management access command are called up as from any file which is being processed, by pressing, together, the FN new functions key 132 and the function key F9. If the original file belongs to the NOTE program, these routines can also be called up by a selection from the menu of the VOICE MANAGER inscription of the window 202 (FIG. 8). The VOICE MANAGER program, called up using the FN and F9 keys, stores in a zone 227 of the DRAM 62 the data identifying the file being processed, data on the content of the screen 37 and the position of a marker which is indicative of the position of the cursor.

The VOICE MANAGER program module, however called up, provides a visual display on the screen 37 of an image (in video form) 241 (FIG. 11) which, in the default condition, relates to the RECORDER cassette, defined as standard for the voice management condition. The video-form image 241 comprises a command window 242, with a menu of selectable commands, an index window 243, with the content of the cassette visually displayed, a function window 244 with symbols of function keys which can be actuated and an auxiliary information window 246.

The command window 242 made up of two rows and has, in the first line, a command menu 247 with inscriptions: MESSAGE, LABEL, ANNOTATE, DEANNOTATE, cmpR, PRINT, SCREEN and QUIT, which are individually selectable and are emboldened as compared with the other inscriptions, for example by actuation of the function key F10 and of one of the cursor keys 131. The selected commands are then executed by the program after actuation of the ENTER key. As an alternative, the commands can be selected and executed by pressing the keys corresponding to the capital letters of the inscriptions, in a manner known per se.

As will be described in detail for certain specific commands, Message permits the processing of the individual verbal messages 233 of the cassette which is visually displayed, as if they were lines of characters; Label permits the name of the cassette which is visually displayed to be changed; Annotate leaves a linkage track for a message 232 on a text which is being processed; Deannotate permits the cancellation from a text of the linkage track for a message 232 which has already been linked; cmpR permits the modification of the compression parameters of the cassette which is visually displayed; Print effects the printing of the list of the names of the messages of the cassette; Screen permits the modification of the subsidiary data of the messages of the cassette; and Quit returns, without links or modifications, to the interrupted program.

The second row of the command window 242 contains descriptions 248 with inscriptions: COPY, EXTRACT, INSERT, DELETE, MERGE and PARAM, which represent specific commands which can be selected and executed and which are dependent upon the MESSAGE command.

Figures 11, 12, 13:
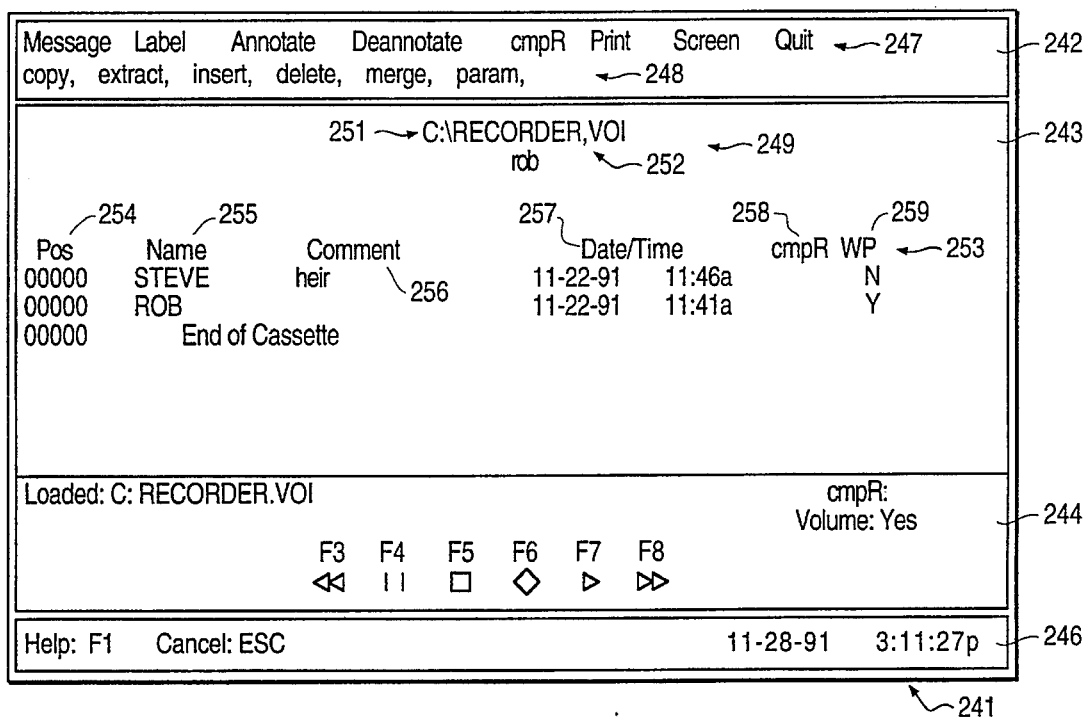
FIG. 11 is a view of the detail of the computer of FIG. 8, in another operational condition.
FIG. 12 shows a diagram of data which can be processed by the computer of FIG. 1.
FIG. 13 shows another diagram of data which can be processed by the computer of FIG. 1.

The index window 243 provides a visual display of unambiguous identification elements for the content of the current cassette 232, such as for example a title line 249, a partition 251 of the mass memory 83 in which the cassette is stored and the name 252 of the cassette. In a descriptive line 253 it is in turn possible to see inscriptions: POS 254, NAME 255, COMMENT 256, DATE/TIME 257, cmpR 258 and WP 259, which relate to the visually displayable information of the identification code 239 of all the verbal messages 233 recorded in the cassette. In FIG. 11, the RECORDER cassette 232 comprises two messages 233 with the pertinent visually displayable information of the identification code.

Pos 254 relates to the start position of the verbal message, as a progressive time, which has elapsed in seconds as from the first character of the first message;

Name 255 is a numerical field of 12 characters containing the name given to the verbal message by the operator;

Comment 256 is a brief description (a maximum of 40 characters) of the content of the verbal message;

Date/time 257 is a field relating to the date and to the time of recording of the verbal message which is automatically stored by the program;

cmpR 258 is an indicator of the zero level (N), the low level (L), and the high level (H) of the compression level used by the operator for the recording of the verbal message; and WP 259 is an inscription protection indicator which, when it is used, avoids accidental deletions of the message.

The window 244 provides a visual display of the partition of the memory 83 and the name of the cassette on which operations are taking place, the selected compression level cmpR, the possible insertion of an automatic volume control and a line with the indications of the function keys F3–F8 and of their symbolic equivalents identical to those of the preset keys 97. The actuation of each one of these keys, in addition to activating the execution of the pertinent function, will embolden the inscription and the symbol of the actuated key in the window 244.

In accordance with the invention, the cassettes with the extension ".VOI" can be handled as data files, of which it is possible to modify some parameters and which may be transferred, copied, merged etc. With regard to the verbal messages 233, after the activation of the MESSAGE command, the operator is enabled to select the specific commands of the line 248. The command PARAM secures access to a submenu by which, by selecting one of the messages, it is possible to correct or to assign ex novo, respectively, the Name 255 of the message, the Comment 256, the Date/time 257, and it is possible to modify the protection of the message.

The identification elements relating to the verbal messages 233 recorded or processed in the EXT REC external recorder operational condition will also be visible in the index window 243. The name 255 and the comment 256 which they intrinsically lack may be added, in the computer operational condition, in a similar way to what is applicable to the modification of the identification elements of the other messages.

The commands COPY and EXTRACT permit, after selection of any verbal message 233, the copying thereof on the same cassette or on another cassette 232 and, respectively, the transposing of the selected message to another cassette 232 or to a different position on the same cassette and in front of a second message. In the latter case, after selection of the first message and actuation of the command EXTRACT, the operator will select the second message and will actuate the command INSERT. In turn, the VOICE MANAGER program will provide for the positioning of the first message, in front of the second message.

The command DELETE permits the deletion of a verbal message and the consequent moving of the subsequent messages on the cassette 232 of the memory locations already occupied by the deleted message. The command MERGE permits the addition to a selected message of the following message and, consequently, the deletion of the line containing the indications of the merged message and the moving by one line of the indications of the other messages on the cassette.

In the default condition, the VOICE MANAGER PROGRAM gains access to the descriptor 237 of the RECORDER cassette 232, for a possible recording, as from the first free character of the memory 83 defined by the code 240. The operator will be able to proceed directly with recording a verbal message by operating the function key F6. The recording will terminate upon the pressing of the key F5. The operator will be able to move about in the current message or between the messages, by pressing the other function keys F3–F9 in a similar way to what has been described with reference to the keys 97 and he will be able accordingly to hear a given message in full or in part and he will be able, in a given message, to add or to overwrite other recordings. In this case also, the reproduction or the recording of one or more messages will terminate upon the pressing of the key F5.

ANNOTATION

The command ANNOTATE, in accordance with the invention, is operative after the recording of a verbal message 233. This activates the VOICE MANAGER program to link the message with an alphanumeric text of the file from which the VOICE MANAGER program had been called up and to leave a linkage track in the text of the program of origin. The linkage is operative both for the text files which have originated from the programs SCHEDULE, PHONE BOOK, ORGANIZER, or from possible imported commercial WP programs, and for text files which have originated from the program NOTE. To this end, the command ANNOTATE causes the VOICE MANAGER program to generate the information relating to the address inserted as a character string. The string will then be handled in a suitable manner, depending on the program from which said VOICE MANAGER program had been called up.

In the external-type links, the VOICE MANAGER program stores in sequence the character string 270 in the DOS standard keyboard buffer of the reserved zone 136 of the DRAM 62 and calls up the program of origin, with all the identification elements of the interruption which are recorded in the zone 227 of the DRAM 62. There is thus called up on the screen 37 the image immediately preceding the interruption, with its cursor. The program called up will further provide for the processing of the content of the keyboard buffer in accordance with the specifically associated procedures. Upon finding in the zone 136 of the DRAM 62 the character string stored by the VOICE MANAGER program, the WP program will introduce into the file the same character string 270, substantially as if it had been generated by the keyboard 35 and temporarily stored in its buffer.

The linkage track comprising the string of alphanumeric characters 270 (FIG. 12) is formed by the less-than sign "<" and the greater-than sign ">" which show the string with respect to the text of the file and includes four fields: "C:" 271, "\XXX" 272, "\YYY" 273 and ";ZZZ" 274, for a total of a maximum of sixteen characters corresponding to the hierarchical organization of the messages. The field "C:" 271 specifies the partition of the mass memory 83 containing the archive; the field "\XXX" 272 contains the name of the archive 231 in which the cassette is found; the field "\YYY" 273 defines the name of the cassette 232 containing the message; and the field ";ZZZ" 274 specifies the name of the message 233 involved in the association with the text in the processing phase. If the field 274 is missing, this indicates that the linkage relates to a verbal insert containing all the messages of the cassette defined by the field 273.

The original WP program, unloading the zone 136, introduces and stores the character string 270, in addition to the characters of the text at the point defined by the marker stored in the zone 227 of the DRAM 62. This leads to the creation of a text with explicit call-ups for verbal inserts of type external to the WP program. The string 270, just like any other group of characters, is visually displayed on the screen 37, while the marker and the cursor are moved downstream of said string. After this storage, the text processing program will handle the other requests by the operator which relate to the text with explicit call-ups in the customary manner, as if that text were a conventional alphanumeric text.

The internal automatic linkage takes place when the command ANNOTATE has been activated in a VOICE MANAGER program which has originated from the NOTE program. This program generates a character string 277 (FIG. 13) having the same field structure 271–274 as the character string 270, in such a manner as to contain the data for the partition, archive, cassette and message markers. The VOICE MANAGER program then stores the string 277 in the zone 226 of the DRAM 62 and calls up the NOTE program with its file 221 which was previously interrupted.

The NOTE program, thus called up, provides a visual display of the last image of its file 221 (FIG. 14) on the basis of the identification data of the zone 226. This program further determines in the zone 223 of the file 221 the serial number relating to the verbal insert in the course of processing which is to be linked to the text, and stores in the zone 223 the character string 277, along with its serial number. The NOTE program now stores as linkage track with the text, in the zone 222, a special ☺(face) 278 (FIG. 13), corresponding by way of example to the ASCII 1 character, which cannot be printed by the NOTE program. With the symbol 276 there is associated the serial number of the verbal insert linked to the file.

The number of the insert is hidden from the user, while the symbol 276, just like any character, is visually displayed on the screen 37. The marker and the cursor are in turn moved from a position, downstream of said symbol. This thus creates a text with masked call-ups for verbal inserts, of a type which is integrated in the file with extension ".NTE". After this storage, the NOTE program will handle the other requests by the operator, in the customary manner.

In both the commercial WP program and the NOTE program, the verbal insert to be linked to the text may be either a message which the operator has recorded without a specific designation, or one of the messages set out in the index window 253. In the latter case, however, the operator must first select said message.

A text with explicit call-ups which has been processed by a commercial WP program can be processed and stored in the memory 83 in a manner which complies entirely with what is provided by said WP program. In the case of the modification of the text, the string 270 will be visible along with the other parts of the text on the screen 37 and, in the case of printing, the string 270 will be printed along with said text.

Furthermore, a text with masked call-ups which has been generated by the NOTE program can also be processed and stored in the memory 83, in a manner which complies entirely with what is provided by said NOTE program. In the case of call-up for modifications, only the symbol Q ☺"face" 276 will be visible along with the other parts of the text, while it will not be possible to see the serial call-up number for the string 277 in the zone 223. The symbol 276 cannot however be deleted by the means which are provided for the deletion of characters. However, in the case of printing, the NOTE program will not print the symbol 276 along with the text, but will leave a space in its place.

CALL-UP OF A MESSAGE

In accordance with the invention, the call-up of a verbal insert from a text with explicit or masked call-ups can be executed easily during the execution of a text processing program. To this end, the VOICE MANAGER program is called up, actuating together the FN key 132 and the function key F9, in the case of a commercial WP program or, even with selection of the Voice inscription in the NOTE program, as described hereinabove.

In the case where the original program is a commercial WP program, the called-up VOICE MANAGER program, in conjunction with the storage in the DRAM 62 of the identification data for the file which is being processed, explores the content in the DRAM downstream of the position of the marker, in order to verify the possible presence of the character "<". Subsequently, this program explores the part upstream of the character "<" to find the character ">" and finally the intermediate part to identify the character string 270. In the case of a negative outcome of the search, it gains access to the base descriptor 234 of the default cassette and visually displays in the image 241 the content of this cassette, as previously described.

If the VOICE MANAGER program recognizes a character string having the same configuration as the string 270, this program identifies the markers relating to the partition, to the archive, to the cassette and to the message, which are indicated in the fields 271, 272, 273 and 274 of said string. This recognition is visually displayed, calling up in the image 241 the data of the cassette identified in the field 274 and emboldening the data of the message 274. The operator may thus, according to his choice, hear the message or modify it, by pressing the function key F7, or the other keys F3, F4, F5 or FS, individually or in combination, as previously described.

In the case where the program of origin is the NOTE program, if the operator calls up the VOICE MANAGER program using the FN and F9 keys, he gains access to the base descriptor 234 of the default cassette and to the image 241, as in the case of a commercial WP. If however the operator calls up the VOICE EAGER program by selection of the inscription of the window 202, prior to gaining access to the VOICE MANAGER program, the NOTE program will control the content of the DRAM 62 location corresponding to the position of the marker, in order to verify the possible presence of the ASCII 01 symbol, indicated by 276. In the absence of recognition, the NOTE program calls up the VOICE MANAGER program with access to the base descriptor 234 of the default cassette and visual display of the content of this cassette.

If, however, the NOTE program recognizes the symbol 276, this program calls up the character string 277 corresponding to its serial number in the zones 223 of the file 221. The NOTE program then calls up the VOICE MANAGER program and supplies, along with the identification data of the file and of the image, the character string 277 which identifies all the markers which define the verbal insert linked to the VOICE MANAGER program. It then visually displays the cassette and indicates the verbal insert linked to the text, emboldening the message or the cassette, in the image 241. The operator may also, in this case, proceed with hearing the verbal insert or with modifying it, by pressing the keys F3–F8.

It clearly emerges from the description given hereinabove that, in order to call up a verbal insert from a text with call-ups at inserts of a commercial WP program or of the NOTE program, it will be sufficient for the operator to position the cursor on the linkage track left on said program and to call up the VOICE MANAGER program. In the case of a commercial WP program, it will be sufficient to position the cursor within the string 270, while, in the case of the NOTE program, the cursor must be positioned on the symbol ☺276 (face) visually displayed on the screen 37.

DEANNOTATE

The opposite procedure to ANNOTATE, consisting in removing the linkage with a verbal insert from a text which is in the processing phase is defined as DEANNOTATE. The execution of the DEANNOTATE command is possible only if the VOICE MANAGER program is called up during the processing of a text with the cursor positioned within the string 270 or on the special symbol which identifies the verbal insert.

This procedures operates as a deletion command which is made operative when the text processing program which was previously interrupted is called up. It is also clear that the linkage between verbal messages and text with call-ups of a commercial WP program can also be eliminated by deleting, using the specific procedures of the text handling program, the characters which form the string 270.

We claim:

1. A portable computer comprising:

an electronic unit able to assume a text processing condition for processing text in accordance with a commercial text processing program, and a voice management condition for storing and reproducing verbal inserts;

an input unit connected to said electronic unit;

an input unit buffer for storing data corresponding to characters and/or graphic symbols digitized by said input unit;

a visual display screen controlled by said electronic unit for visually displaying said text;

a voice section connected to said electronic unit for generating digital voice signals which define said verbal inserts;

an external memory linked with said electronic unit for storing said digital voice signals;

a base body to carry said electronic unit, having an upper surface to support said input unit;

a cover of said base body for carrying said visual display screen, said cover being movable between a closed position, in which said cover protects both said input unit and said screen, and an open position in which said cover allows access to said input unit and visibility of said screen;

preset keys for said voice section which are supported by said cover and are accessible when said cover is both in said open position and in said closed position, said preset keys controlling said electronic unit in said voice management condition;

voice management access command means activatable for placing said electronic unit in said voice management condition, starting from said text processing condition; and annotation means activatable for returning said electronic unit to said text processing condition, starting from said voice management condition, and for inserting in a text processed during said text processing condition a linkage track including an alphanumeric character string indicative of a linking between said text and a corresponding linked verbal insert of said verbal alphanumeric character string being inserted in said text in a position identified by a cursor on said visual display screen and equal to the position where said cursor was placed when said voice management command access means were activated;

wherein said annotation means generate said alphanumeric character string to represent an address of said linked verbal insert, and store buffer data in said input unit for identifying said alphanumeric character string, said alphanumeric character string being processed in said text by said commercial text processing program in the same way that said alphanumeric character string is digitized by said input unit; and wherein switching means are movable between an enabling position for enabling said preset keys and a disabling position for disabling said preset keys, said switching means preventing an unintentional activation of said preset keys.

2. A portable computer according to claim 1, wherein said voice management access command means comprise a multifunction key which can be actuated along with a function key to switch said electronic unit from said text processing condition to said voice management condition.

3. A portable computer according to claim 1, wherein said electronic unit assumes a further text processing condition for processing text in accordance with a particular text processing program, said particular text processing program being used as an alternative to said commercial text processing program, and wherein said annotation means are activatable for returning said electronic unit from said voice management condition to said further text processing condition for generating and placing in said text processed by said particular text processing program a track symbol to represent a linking between said text and a corresponding linked verbal insert, said track symbol being displayable but not printable by said particular text processing program.

4. A portable computer according to claim 1, wherein said annotation means emphasizes said alphanumeric character string as compared with said text by storing buffer data in said input unit corresponding to a first symbol and a second symbol and by placing said first symbol and said second symbol before and after said alphanumeric character string respectively, said first and second symbols being displayed on said visual display screen and being printed and processed together with said alphanumeric character string by said commercial text processing program.

5. A portable computer according to claim 4, comprising a mode indicator visible when said cover is in said closed position for displaying characters and symbols indicative of different operational conditions of said electronic unit.

6. A portable computer comprising:

an electronic unit able to operate either in a voice management condition for generating verbal inserts from vocal messages and for reproducing said verbal inserts, or in a text processing condition for processing text, said verbal inserts being defined by digital voice signals stored in a memory connected to said electronic unit;

a base body to receive said electronic unit and having an upper surface to support said input unit;

a visual display screen;

a cover of said base body, said cover carrying said visual display screen and being capable of being positioned between a closed position, in which said cover protects the input unit and said screen, and an open position, in which said cover allows access to said input unit and visibility of said screen, voice management access command means activatable for placing said electronic unit in said voice management condition, starting from said text processing condition and when processing said text;

annotation means activatable for returning said electronic unit to said text processing condition to continue processing said text, starting from said voice management condition, and for inserting in said text a linkage track indicative of a linking between said text and corresponding linked verbal insert of said verbal inserts, said linkage track being inserted in said text in the same position identified by a cursor on said visual display screen and equal to the position cursor was placed when said voice management command access means were activated; and verbal insert call-up means which can be selectively actuated to call up one of the verbal inserts linked with said text upon placing said cursor on the linkage track indicative of the linking between said text and said selected linked verbal insert for reproducing or processing said selected verbal insert;

wherein external preset voice keys are supported by a surface of said cover and accessible when said cover is in said closed position, said external preset voice keys controlling said electronic unit in said voice management condition for generating and storing said verbal inserts; and wherein switching means are activatable in an enabling or in a disabling condition to enable or disable said preset keys respectively, whereby in said enabling condition said preset voice keys can be actuated to generate and store said verbal inserts, and an unintentional activation of said preset keys can be avoided when said switching means is activated.

7. A portable computer according to claim 6 wherein said linkage track includes a string of characters and symbols, which identify an address of said linked verbal insert.

8. A portable computer according to claim 7, comprising a mode indicator which can be observed when said cover is in said closed position to display characters and symbols indicative of different operational conditions of said electronic unit.

9. A portable computer according to claim 7 wherein said preset keys are carried by said cover on its external surface and wherein said preset keys are activatable for activating functions similar to the functions of recording and reproducing in a conventional magnetic cassette recorder.

\* \* \* \* \*